United States Patent Office 2,714,585
Patented Aug. 2, 1955

2,714,585

CURING OF SILICONE RESINS WITH ALUMINUM CROTONATE

Maynard C. Agens, Schenectady, N. Y., assignor to General Electric Company, a corporation of New York No Drawing. Application May 26, 1954,
Serial No. 432,608

6 Claims. (Cl. 260—46.5)

The present invention relates to polysiloxane resins, that is, heat-hardenable organopolysiloxanes containing more than 1.0 and less than 2, preferably from about 1.1 to 1.7, hydrocarbon radicals attached directly to silicon atoms. It is particularly concerned with compositions containing a polysiloxane resin as a resinous component thereof and a curing catalyst for said resin, comprising aluminum crotonate having the formula:

$$HO-Al\left(O-\overset{O}{\underset{\parallel}{C}}-\overset{H}{\underset{}{C}}=\overset{H}{\underset{}{C}}-CH_3\right)_2$$

The polysiloxane resins of the type of which the present invention is concerned are described, for example, in U. S. Patents 2,258,218–222 of Eugene G. Rochow. The resins, which comprise a plurality of hydrocarbon-substituted silicon atoms linked by oxygen atoms are prepared, for example, by hydrolysis and condensation of a mixture of organosilicon halides. Such resins usually contain small amounts of silicon-bonded hydroxyl or alkoxy groups as a result of the method of hydrolyzing the intermediate silanes used to prepare the polysiloxane. The commercially useful products containing an average of more than one and less than two hydrocarbon radicals per silicon atom are soluble in many solvents and are converted to a hard, insoluble state when heated for comparatively long periods of time at elevated temperatures. Other examples of organopolysiloxane resins embraced within the scope of the present invention may be found described in Welsh Patent 2,449,572 issued September 21, 1948.

The present invention is based on the discovery that aluminum crotonate is able to 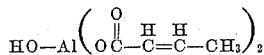 polysiloxane resins hardenable and catalyst can be cured to a solid state in much shorter time and lower temperature than uncatalyzed resins. In addition, it has also been found unexpectedly that the use of aluminum crotonate as a curing agent for the polysiloxane resin imparts improved flexibility to the resin when employed as a coating film. The usual curing agents for silicon resins are often deficient in this respect, since the resins often become embrittled as a result of having been cured to the solid, infusible state by the use of curing agents heretofore employed.

The aluminum crotonate catalyst employed in the curing of the organopolysiloxane resins in accordance with the present invention differs from the metallo-organic salts described in the aforesaid Welsh patent by the presence of an aluminum-bonded hydroxyl group which affords a point of interaction between the catalyst itself and any silicon-bonded hydroxyl or alkoxy radicals present in the organopolysiloxane resin, thus permitting intimate interaction between the resin and the catalyst and thus imparting good flexibility; in addition, the aluminum crotonate has an olefinic unsaturation. Both these characteristics of the aluminum crotonate are absent in the metallo-organic salts described in the Welsh patent. Moreover, the presence of the unsaturation in the aluminum crotonate unexpectedly imparted good storage and processing stability to the organopolysiloxane resin containing the same at room temperature. In contrast to this, when aluminum butyrate (which has the same number of carbon atoms in the acid residue as does the crotonic acid residue of aluminum crotonate) was incorporated in the above-described methyl phenylpolysiloxane resin in the same equivalent amount as the aluminum crotonate, as described in Example 1, the resin gelled rapidly even at room temperature.

Aluminum crotonate may be prepared by effecting reaction between aluminum hydroxide and crotonic acid in a mole ratio of at least two moles of the crotonic acid per mole of aluminum hydroxide. Alternatively, the aluminum crotonate may be prepared by effecting reaction between an aqueous solution of sodium crotonate and aluminum trichloride, and precipitating and recovering the aluminum crotonate.

The amount of aluminum crotonate employed in the practice of the present invention may be varied widely. Thus, on a weight basis, and based on the weight of the organopolysiloxane resin, I may employ from about 0.5 to 10 percent, preferably from 1 to 5 percent, of the aluminum crotonate without harmful effects on the properties of the cured resin. In this respect, the amount of aluminum crotonate required is materially larger than those ordinarily employed using other commonly known metallo-organic salts, for instance, those described in the above-mentioned Welsh Patent 2,449,572. The ability to use larger amounts of aluminum crotonate without deleterious effect on the properties of the resin is a marked advantage, since the presence of a larger amount of aluminum crotonate appears to improve the flexibility of the organopolysiloxane resin and imparts to the cured resin increased resistance to cracking.

The aluminum crotonate may be added to the organopolysiloxane resin in various solvents, such as xylene, toluene, butanol, etc., as well as mixtures of the aforegoing and other solvents commonly employed with organopolysiloxane resins. Solutions of the aforesaid resinous mixture may be used in various concentrations, for instance, as low as 2 to 10 percent and as high as 40 or 50 percent organopolysiloxane resin solids, based on the total weight of the solution. Various fillers, such as titanium dioxide, ferric oxide, etc.. in varying amounts may be incorporated without departing from the scope of the invention. These organopolysiloxane resins containing aluminum crotonate as a curing agent may be deposited in the form of films (from solutions) and thereafter heated at elevated temperatures of the order of about 150° to 250° C. for times ranging from about 2 minutes to about 4 to 5 hours, depending on such factors as, for instance, the organopolysiloxane resin, the amount of aluminum crotonate, the temperature at which the curing is carried out, the substrate upon which the film of organopolysiloxane resin is deposited, etc.

In order that those skilled in the art may better understand how the present invention may be practiced, the following examples are given by way of illustration and not by way of limitation. All parts are by weight.

The aluminum crotonate employed in the following example was prepared as follows:

An 8 to 10 percent aqueous solution of crotonic acid was neutralized with sodium hydroxide using phenolphthalein as the indicator. To this solution of sodium crotonate was added a 50% solution of aluminum chloride. The aluminum chloride addition caused precipitation of aluminum crotonate as a white amorphous solid which was removed by filtration. Additional amounts of the aluminum chloride solution were added to the sodium crotonate solution until no more precipitate of aluminum crotonate was obtained. The precipitates of aluminum crotonate were combined and washed several times with distilled water and then dried in an oven at 100° C. Analysis of this product showed it to comprise essentially aluminum crotonate of the previously designated formula as evidenced by the fact that it was found to contain 11.8% aluminum (theoretical 12.6% aluminum).

*Example 1*

An organopolysiloxane resin was prepared by cohydrolyzing 45.7 parts methyltrichlorosilane, 38.7 parts phenyltrichlorosilane and 15.6 parts dimethyldichlorosilane, in the manner described in Welsh and Holdstock Patent 2,661,348 issued December 1, 1953. The resin thus obtained, which was in the form of a 60 percent solids xylene solution, was mixed with aluminum crotonate in an amount equal to 415 parts of the silicone resin solution to 5 parts of the aluminum crotonate. This mixture was spread as a film on a copper panel and heated at 250° C. for about 5 minutes, at the end of which time it was found that the film was hard and flexible. A control sample of the methylphenylpolysiloxane resin alone without any curing agent after this heating period was still soft and cheesy.

*Example 2*

To 18 parts of the methyl phenylpolysiloxane resin solution described in Example 1 was added about 0.4 part aluminum crotonate. This resin solution was applied to a copper plate and baked for about 15 hours at about 200° C. At the end of this time, it was found that the thin film deposited and cured on the copper plate was flexible and hard.

*Example 3*

In this example, a white enamel was prepared from 110 parts of the above-identified methyl phenylpolysiloxane resin solution, 2.2 parts aluminum crotonate, and 74 parts titanium dioxide. This mixture of ingredients was ball-milled and then used to coat steel panels. The coated panels were given a preliminary bake of about 1 minute at 150° C., followed by bakes of 5 minutes and 11 minutes at 260° C. A sample of the panel having 1 minute at 150° C. and 5 minutes at 260° C. bake exhibited a film covering which was very hard and smooth, and resisted markedly efforts to crack the surface of the film by mechanical means. The sample baked 11 minutes at 260° C. was indistinguishable from the samples baked for 5 minutes at 260° C. indicating the marked heat resistance of these materials at elevated temperatures.

While the invention has been described with particular reference to methyl phenylpolysiloxane resins, it is to be understood that it is broadly applicable to any soluble polysiloxane resins which have organic radicals attached directly to silicon in which the organic radicals may be selected from the class consisting of alkyl (e. g., methyl, ethyl, propyl, etc.), aryl (e. g., phenyl, naphthyl, etc.), alkaryl (e. g., tolyl, xylyl, etc.) and aralkyl (e. g., benzyl, phenylethyl, etc.) radicals. The presence of inert substituents on the hydrocarbon radicals such as halogen radicals, particularly chlorine radicals, as well as the presence of unsaturated silicon-bonded radicals attached to silicon by carbon-silicon linkages, for instance, the vinyl, allyl, cyclohexenyl, etc., radicals is not precluded. Such resin may also contain two or more different radicals attached to silicon as is the case with certain methyl phenyl resins, in which one of the hydrolyzable organohalogenosilanes is, for instance, methyl phenyl dichlorosilane.

The catalyzed resins may be used to advantage as a basis for enamels, particularly white or colored enamels. In addition, they are eminently suitable for insulating purposes requiring a low power factor and good heat resistance. For example, the catalyzed resin may be combined with paper, glass cloth, cotton cloth, or other sheet material, and the resultant product employed as a condenser dielectric, wire and cable insulation, etc.

What I claim as new and desire to secure by Letters Patent of the United States is:

1. A composition of matter comprising (1) a heat-hardenable hydrocarbon-substituted polysiloxane resin, containing an average of more than 1 and less than 2 hydrocarbon groups per silicon atom and (2) a curing catalyst for the said resin comprising aluminum crotonate having the formula

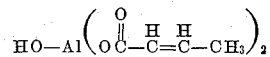

the said curing agent being present in an amount sufficient to convert the said resin in the presence of heat to a cured, tack-free state.

2. A composition of matter comprising (1) a methyl polysiloxane resin containing an average of more than 1 and less than 2 methyl groups per silicon atom and (2) a curing catalyst for said polysiloxane resin comprising aluminum crotonate having the formula

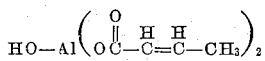

present in an amount equal to from 0.5 to 10 percent, by weight, based on the weight of the resin.

3. A composition of matter comprising (1) a methyl phenylpolysiloxane resin containing an average of more than 1 and less than 2 total methyl and phenyl groups per silicon atom and (2) a curing catalyst for said resin comprising aluminum crotonate having the formula

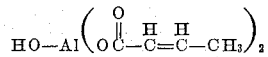

present in an amount equal to from 0.5 to 10 percent, by weight, based on the weight of the methyl phenylpolysiloxane resin.

4. A composition as in claim 1, in which the polysiloxane resin is dissolved in a solvent.

5. An organopolysiloxane composition as in claim 2, in which the methylpolysiloxane resin is dissolved in a solvent.

6. A composition as in claim 3, in which the methyl phenylpolysiloxane resin is dissolved in a solvent.

No references cited.